Patented May 20, 1930

1,759,017

UNITED STATES PATENT OFFICE

GEORGE J. MILLER, OF DOUGLAS, ARIZONA

PROCESS OF RECLAIMING RUBBER

No Drawing.   Application filed March 19, 1928.   Serial No. 262,990.

My invention is an improvement on the process of my Patent #1,657,171 issued January 24, 1928, which particularly has for its object to improve that part of the process disclosed in my patent aforesaid which has to do with the separation of the rubber compound and cotton, when the cotton is present.

Further, it is an object to obain a quicker, cheaper and better separation of the cotton and rubber compound and the more efficient cleansing of the remaining rubber compound from residual zinc chloride and acid (these exerting a deteriorating effect on the rubber upon aging) and the recovering of zinc from the exhausted solution thus effecting a further saving.

The improved way of dissolving the cotton is carried out as follows, viz:

The rubber compound and cotton, already ground as explained in the original patent, is placed in a closed boiling arrangement or digester, together with the requisite amount of solution of zinc chloride, acidified with hydrochloric acid, the zinc chloride strength being from 3 to 12% as compared with the 40 or 50% necessary in an open vessel, and the hydrochloric acid constituting from 1 to 5% of the solution.

Pressure is generated, either by applying heat to the digester, or by introducing steam from an outside source. In either case the temperature of the solution is maintained at a higher point than is possible in an open vessel, say at from 140 degrees centigrade to 180 degrees, the average temperature being about 150. The pressure varies from 30 lbs. to 180 lbs. steam gauge pressure, according to the kind of rubber being treated, the average pressure being about 50 lbs. per square inch as indicated on the usual steam gauge.

Under the combined influence of the heat and pressure, a much quicker solution of the cotton is effected, a better and quicker penetration of the rubber mass is effected by the solution, and a weaker solution of zinc chloride is permissible thus effecting a saving.

The time of solution of the cotton is reduced, to from 25 minutes for a 3% solution of zinc chloride, and 10 minutes for a 12% solution, at a pressure of 50 lbs. per inch.

When the cotton is dissolved, the exhausted solution is drained from the digester, and fresh water is introduced, and maintained at the same temperature and its corresponding pressure as at first. Under these conditions, the water penetrates quickly every part of the mass, efficiently washing out every trace of residual zinc chloride and hydrochloric acid, accomplishing in about ten minutes' time what five hours' boiling in an open vessel was unable to accomplish.

The exhausted zinc chloride solution, containing zinc chloride, cellulose and hydrochloric acid, is subjected in any suitable apparatus usual to such purposes, to the process of electrolysis, by means of which the zinc is recovered in metallic form, and can be dissolved in fresh hydrochloric acid, a comparatively cheap ingredient, for re-use.

As the electrolysis of the solution makes possible the recovery of zinc, effecting a further saving in this particular matter of cotton separation, it is believed that it should be considered as an integral part of the improvement, for this particular purpose and no other.

What I claim is:

1. The treatment of rubber compound and cotton to remove the cotton by solution in acidified zinc chloride solution, in a closed digester, under the influence of heat and pressure, and the subsequent washing of the remaining rubber by digesting it in a closed digester under the influence of heat and pressure.

2. In the process of reclaiming rubber from a mass containing rubber and cotton by the treatment of the rubber and cotton with acidified zinc chloride solution in a closed digester under the influence of heat and pressure; the steps which consist in first removing the exhausted solution from the digester, then introducing fresh water to the mass in the digester and maintaining the same under the influence of heat and pressure substantially as specified.

3. In the process of reclaiming rubber wherein the mass containing rubber and cotton is treated with acid zinc chloride solution in a closed digester under the influence of heat and pressure of definite degrees; the steps which consist in drawing off the spent solvent from the mass in the digester and substituting therefor fresh water and thereafter maintaining the mass in the digester under the influence of heat and pressure of the same degree as before, as and for the purposes specified.

GEORGE J. MILLER.